United States Patent
Jeong et al.

(10) Patent No.: US 9,467,908 B2
(45) Date of Patent: Oct. 11, 2016

(54) METHOD OF SELECTING PUBLIC LAND MOBILE NETWORK FOR NETWORK SHARING

(71) Applicant: Samsung Electronics Co., Ltd., Suwon-si, Gyeonggi-do (KR)

(72) Inventors: Sang Soo Jeong, Suwon-si (KR); Han Na Lim, Seoul (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/407,317

(22) PCT Filed: Jun. 14, 2013

(86) PCT No.: PCT/KR2013/005280
§ 371 (c)(1),
(2) Date: Dec. 11, 2014

(87) PCT Pub. No.: WO2013/187728
PCT Pub. Date: Dec. 19, 2013

(65) Prior Publication Data
US 2015/0172965 A1  Jun. 18, 2015

Related U.S. Application Data

(60) Provisional application No. 61/659,623, filed on Jun. 14, 2012.

(51) Int. Cl.
*H04W 36/00* (2009.01)
*H04W 36/38* (2009.01)
*H04W 36/14* (2009.01)

(52) U.S. Cl.
CPC ..... *H04W 36/0033* (2013.01); *H04W 36/0061* (2013.01); *H04W 36/14* (2013.01); *H04W 36/385* (2013.01)

(58) Field of Classification Search
CPC ........... H04W 36/0033; H04W 36/14; H04W 36/385; H04W 36/0061
See application file for complete search history.

(56) References Cited

U.S. PATENT DOCUMENTS

2006/0073831 A1   4/2006 Guyot et al.
2006/0291455 A1*  12/2006 Katz ............... H04L 29/06
                                              370/355

(Continued)

FOREIGN PATENT DOCUMENTS

WO   2011-083664 A1   7/2011

OTHER PUBLICATIONS

3GPP TR 22.852 V0. 2.0, Study on RAN Sharing Enhancements (Release 12), May 21, 2012.

(Continued)

*Primary Examiner* — Brian D Nguyen
(74) *Attorney, Agent, or Firm* — Jefferson IP Law, LLP

(57) ABSTRACT

The present invention relates to a method of selecting a public land mobile network (PLMN) for network sharing, and a method of communicating at a base station according to one embodiment of the present invention may include: receiving from a core network a handover request message including information on whether to support network sharing of user equipment (UE); selecting a PLMN identification (ID) by using information on whether to support network sharing of the UE; and transmitting the selected PLMN ID to the UE. According to one embodiment of the present invention, since a source base station, a target base station or a core network node may select a correct PLMN depending on the situation of UE when carrying out a handover, it is possible to decrease unnecessary signaling and errors in a network sharing situation.

28 Claims, 16 Drawing Sheets

(56) References Cited

U.S. PATENT DOCUMENTS

| | | | |
|---|---|---|---|
| 2007/0161373 A1* | 7/2007 | Klatt | H04W 48/18 455/434 |
| 2009/0086672 A1* | 4/2009 | Gholmieh | H04W 48/14 370/329 |
| 2009/0270099 A1* | 10/2009 | Gallagher | H04W 8/08 455/435.1 |
| 2010/0261474 A1 | 10/2010 | Gollapudi et al. | |
| 2011/0280217 A1* | 11/2011 | Drevon | H04W 48/18 370/331 |
| 2012/0046034 A1* | 2/2012 | Lu | H04W 48/18 455/435.2 |
| 2013/0237225 A1* | 9/2013 | Martin | H04W 36/0055 455/436 |

OTHER PUBLICATIONS

3GPP TS 23.251 V11.1.0, Networking Sharing; Architecture and functional description (Release 11), Mar. 9, 2012.

3GPP TR 22.951 V10.0.0, Service aspects and requirements for network sharing (Release 10) Apr. 8, 2011.

Alcatel-Lucent: "Discussion on NAS vs AS alternatives for Full-MOCN-GERAN issues", 3GPP Draft; S2-122040 Discussion on NAS vs AS Alternatives for Full-MOCN-GERAN V1. 3rd Generation Partnership Project T3GPP). Mobile Competence Centre; 650, Route Des Lucioles; F-06921 Sophia-Antipolis Cedex; France, vol. SA WG2, No. Kyoto. Japan; May 21, 2012-May 25, 2012. May 15, 2012, XP050632560.

Teliasonera: "CS fallback to MOCN", 3GPP Draft; C1-121098, 3rd Generation Partnership Project (3GPP), Mobile a Competence Centre; 650, Route Des Lucioles; F-06921 Sophia-Antipolis Cedex; France, vol. CT WG1, No. Taipei, Taiwan; Apr. 16, 2012-Apr. 20, 2012. Apr. 5, 2012, XP050587284.

SA2: "LS on handovers in Full-MOCN-GERAN", 3GPP Draft; GP-120556 S2-121922 WAS 1889 WAS1631_WAS1557_Reply GP-111802 LS Full-MOCN-GERAN-Handovers, 3rd Generation Partnership Project (3GPP), Mobile Competence Centre; 650, Route Des Lucioles; F-06921 Sophia Antipolis Cedex; France, vol. TSG GERAN, No. Sanya; May 14, 2012-May 18, 2012, May 3, 2012, XP050595245.

Teliasonera: "Introduction of GERAN network sharing capability", 3GPP Draft; C1-121512, 3rd Generation Partnership Project (3GPP), Mobile Competence Centre; 650, Route Des Lucioles; F-06921 Sophia-Antipolis Cedex; France. vol. CT WG1, No. Taipei, Taiwan; Apr. 16, 2012-Apr. 20, 2012, Apr. 23, 2012, XP050587719.

* cited by examiner

METHOD OF SELECTING PUBLIC LAND MOBILE NETWORK FOR NETWORK SHARING

TECHNICAL FIELD

The present invention relates to a Public Land Mobile Network (PLMN) selection method for network sharing.

BACKGROUND ART

Network sharing is a concept introduced to allow operators to share a Radio Access Network (RAN) node (i.e. RAN sharing). With the popularization of Long Term Evolution (LTE), it has become necessary for the operators who removed the 2G/3G infrastructures to share the RAN node (or cell under control of a base station) on account of the legacy 2G/3G terminal users. The base station supporting the network sharing may broadcast a Public Land Mobile Network Identifier (PLMN ID) of the operators sharing the base station.

FIG. 1 is a schematic diagram illustrating a network sharing concept according to a conventional technology.

Referring to FIG. 1, there may be supporting User Equipment (UE) having PLMN selection function capable of selecting one of PLMN IDs broadcast by 2G/3G network and non-supporting UE having no PLMN selection function in the network sharing mode. In this case, in order to assist the non-supporting UE to operate normally in the network sharing mode, the base stations (or the cells under the control of the base stations) 120 and 125 may broadcast a common PLMN ID 130 and 135 determined through negotiation among the operators 111, 113, and 115. If the base stations 120 and 125 broadcast the common PLMN ID 130 and 135, the other PLMN IDs which are called additional PLMN IDs 141, 143, and 145 can be used only by the supporting UEs.

DISCLOSURE OF INVENTION

Technical Problem

The present invention has been proposed to fulfil the above necessity and aims to provide a PLMN selection method capable of allowing a handover source or target base station or a core network node to select a PLMN correctly in adaptation to the status of the UE so as to reduce unnecessary signaling and error in a network sharing situation.

The objects of the present invention are not limited to the aforesaid, and other objects not described herein with be clearly understood by those skilled in the art from the descriptions below.

Solution to Problem

In accordance with an aspect of the present invention, the communication method of a base station includes receiving a handover request message including network sharing capability information of a terminal from a core network, selecting a Public Land Mobile Network (PLMN) Identifier (ID) based on the terminal network sharing capability information, and transmitting the selected PLMN ID to the terminal.

Preferably, selecting the PLMN ID includes determining whether the terminal is a network sharing supporting terminal and selecting, when the terminal is not the network sharing supporting terminal, a common PLMN ID.

Preferably, selecting the PLMN ID includes determining, when the terminal is the network sharing supporting terminal, whether the PLMN ID allocated to the terminal before receiving the handover request message is identical with the common PLMN ID and selecting, when the PLMN ID allocated to the terminal before receiving the handover request message is identical with the common PLMN ID, the common PLMN ID.

Preferably, selecting the PLMN ID includes selecting, when the PLMN ID allocated to the terminal before receiving the handover request message is identical not with the common PLMN ID, an additional PLMN ID.

Preferably, selecting the PLMN ID includes determining whether the PLMN ID allocated to the terminal before receiving the handover request message is identical with an additional PLMN ID and selecting, when the PLMN ID allocated to the terminal before receiving the handover request message is identical with an additional PLMN ID, the additional PLMN ID.

In accordance with another aspect of the present invention, a communication method of a base station includes determining whether handover of a terminal is required, receiving terminal network sharing capability information from a core network, selecting a Public Land Mobile Network (PLMN) Identifier (ID) based on the terminal network sharing capability information, and transmitting the selected PLMN ID to the core network.

In accordance with another aspect of the present invention, a communication method of a core network includes receiving terminal network sharing capability information from a terminal, selecting a Public Land Mobile Network (PLMN) Identifier (ID) based on the terminal network sharing capability information, and transmitting the selected PLMN ID to a base station.

In accordance with another aspect of the present invention, a base station includes a communication unit which communicates with a base station and a core network and a control unit which controls receiving a handover request message including network sharing capability information of a terminal from a core network, selecting a Public Land Mobile Network (PLMN) Identifier (ID) based on the terminal network sharing capability information, and transmitting the selected PLMN ID to the terminal.

In accordance with another aspect of the present invention, a base station includes a communication unit which communicates with a terminal and a core network and a control unit which determines whether handover of a terminal is required and controls receiving terminal network sharing capability information from a core network, selecting a Public Land Mobile Network (PLMN) Identifier (ID) based on the terminal network sharing capability information, and transmitting the selected PLMN ID to the core network.

In accordance with still another aspect of the present invention, a core network includes a communication unit which communicates with a terminal and a base station and a control unit which controls receiving terminal network sharing capability information from a terminal, selecting a Public Land Mobile Network (PLMN) Identifier (ID) based on the terminal network sharing capability information, and transmitting the selected PLMN ID to a base station.

Advantageous Effects of Invention

The PLMN selection method of the present invention is advantageous in terms of allowing a handover source or target base station or a core network node to select a PLMN correctly in adaptation to the status of the UE so as to reduce unnecessary signaling and error in a network sharing situation.

The advantages of the present invention are not limited to the aforesaid, and other advantages not described herein be clearly understood by those skilled in the art from the descriptions below.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Further, the following terms are defined in consideration of the functionality in the present invention, and may vary according to the intention of a user or an operator, usage, etc. Therefore, the definition should be made on the basis of the overall content of the present specification.

Figure 1:
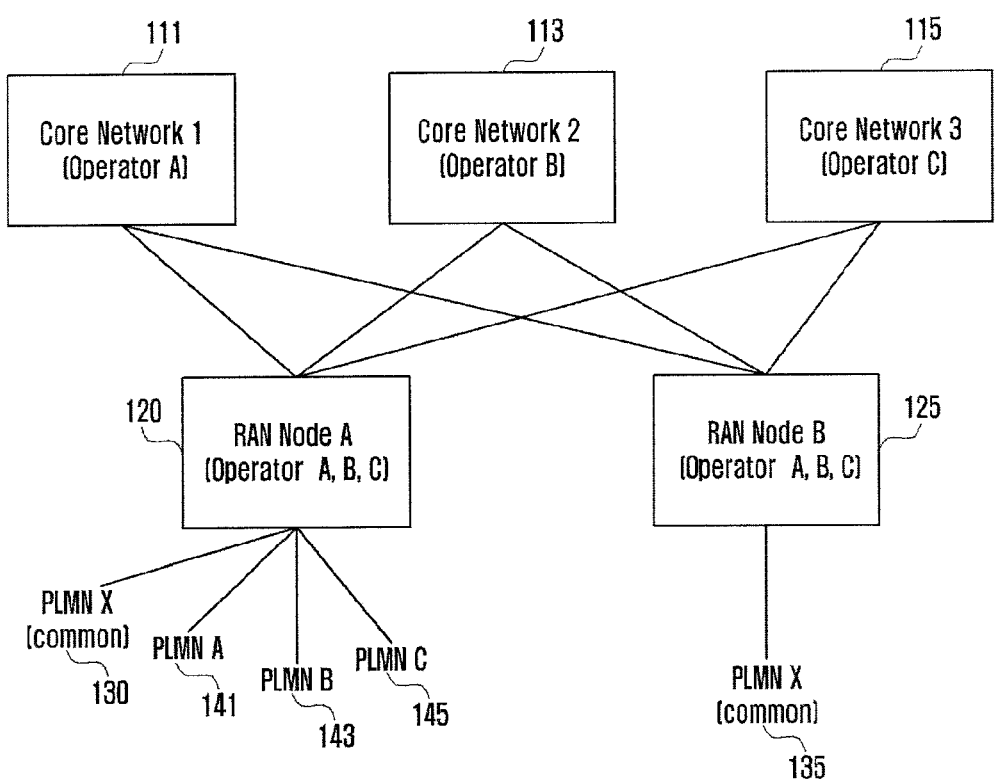
FIG. 1 is a schematic diagram illustrating a network sharing concept according to a conventional technology.
Figure 2:
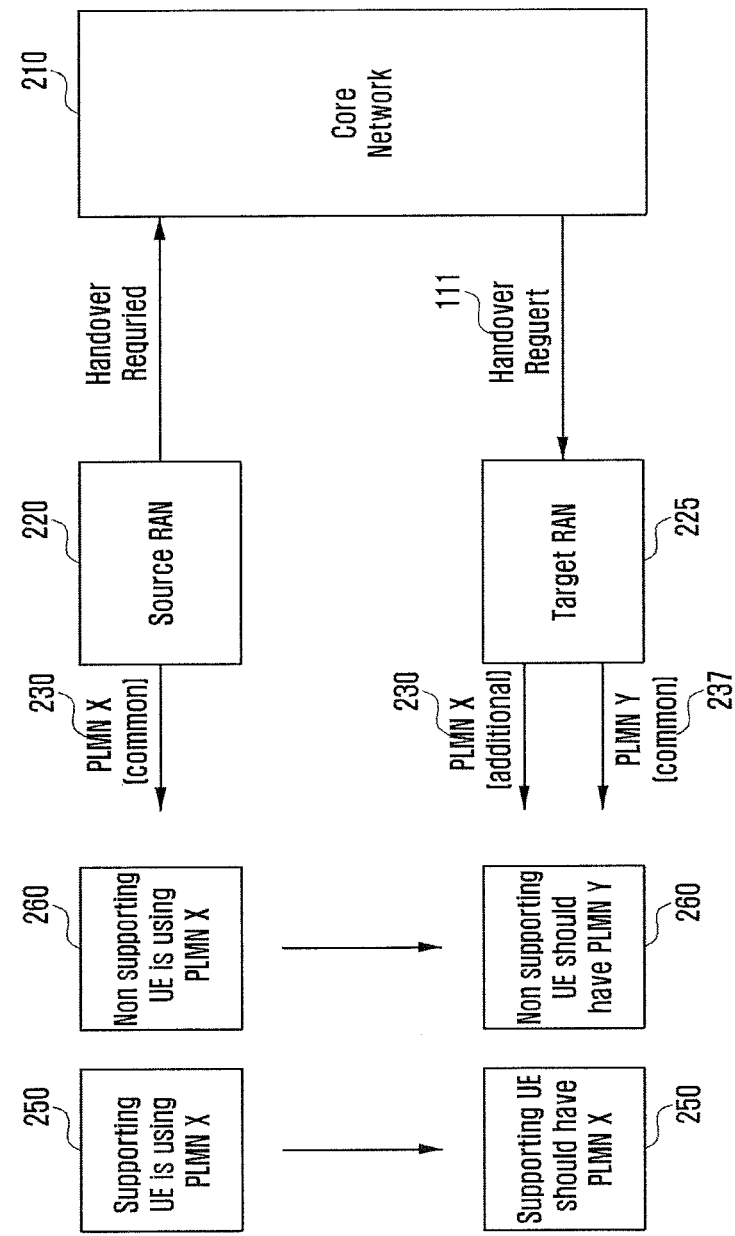
FIG. 2 is a diagram illustrating the network sharing procedure.

FIG. 2 is a diagram illustrating the network sharing procedure.

Referring to FIG. 2, the source base station 220 broadcasts the PLMN X 230 as a common PLMN ID. There are the network sharing supporting UE 250 and the network sharing non-supporting UE 260 which use the common PLMN X 230. The network sharing supporting UE may also be referred to as 'supporting UE,' and the network sharing non-supporting UE AS 'non-supporting UE.' The two UEs 250 and 260 may hand over to a neighboring base station 225, i.e. target base station 225, using the PLMN X 230 as the additional PLMN ID and the PLMN Y 237 as the common PLMN ID. At this time, it is preferred for the supporting UE 250 to use the PLMN X 235 to avoid unnecessary complex inter-PLMN handover. However, the non-supporting UE 260 has to use the common PLMN, i.e. the common PLMN Y 237.

However, unlike in the idle state where they select the PLMN broadcast by the base station, the UEs 250 and 260, in the middle of the handover procedure, receives the information on target Radio Access Network (RAN) 225 from the source RAN instead of listening to the broadcast information and thus the PLMN selection procedure is omitted. There are three approaches for PLMN selection of the UEs 250 and 260 in the handover procedure. First, the target RAN 225 selects the PLMN for use of the UEs 250 and 260 (the first approach). Second, the source RAN 220 selects the PLMN which the UEs 250 and 260 are to be used under the control of the target RAN 225 after handover (the second approach). Finally, the Core Network (CN) node 210 selects the PLMN which the UEs 250 and 260 are to use under the control of the target RAN 225.

In order for the source RAN 220 or target RAN 225 to select the PLMN on behalf of the UEs 250 and 260, it is necessary to know whether each of the UEs 250 and 260 is a supporting UE or a non-supporting UE.

A description is made of the method for the target RAN to select the PLMN for by a UE according to the first approach hereinafter.

Figure 3:
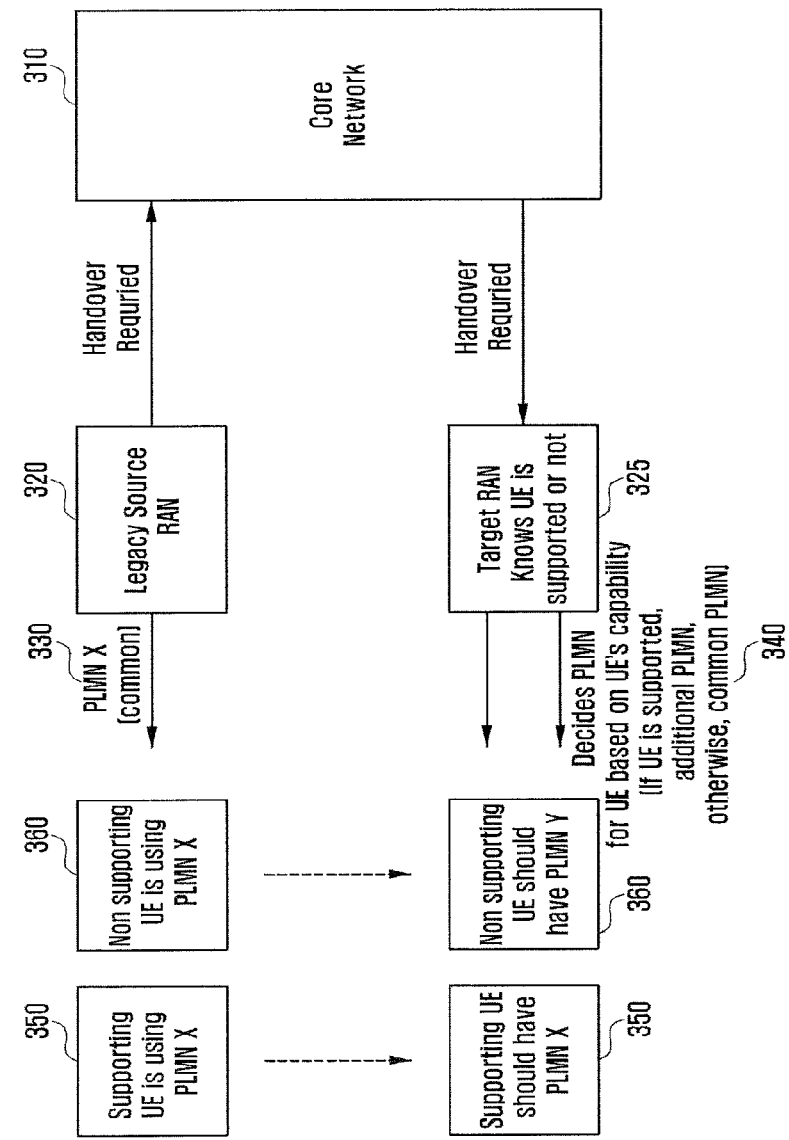
FIG. 3 is a diagram illustrating a network sharing procedure according to an embodiment of the present invention.
Figure 4:
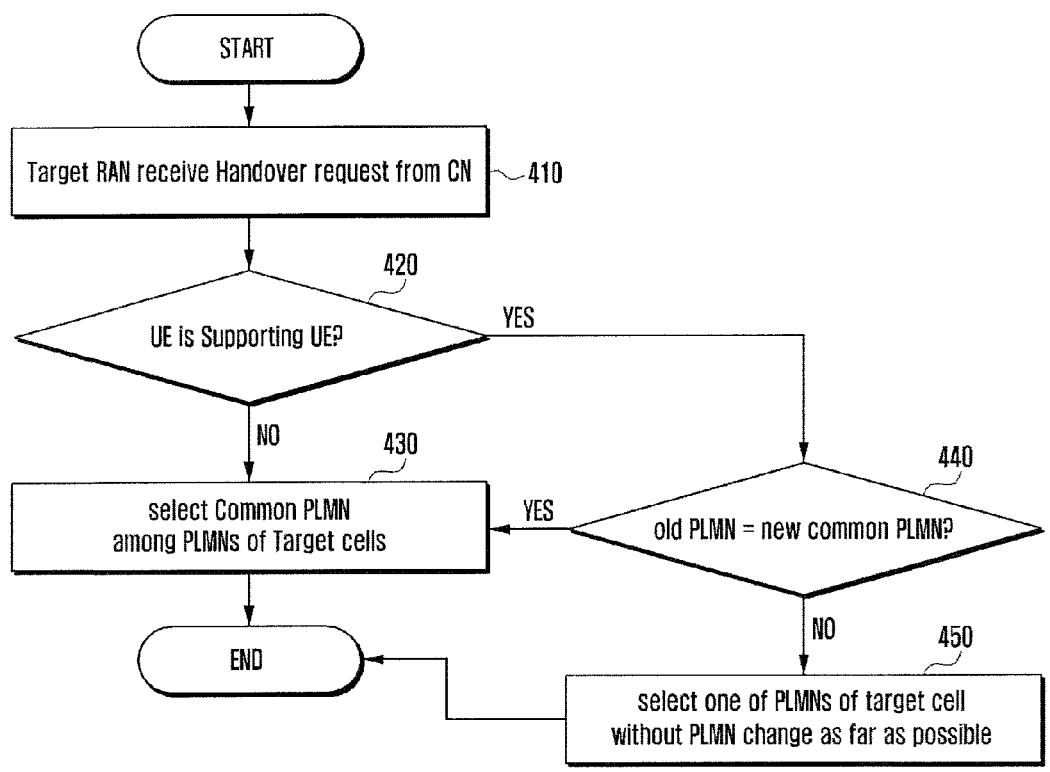
FIG. 4 is a flowchart illustrating a PLMN allocation procedure according to an embodiment of the present invention.

FIG. 3 is a diagram illustrating a network sharing procedure according to an embodiment of the present invention, and FIG. 4 is a flowchart illustrating a PLMN allocation procedure according to an embodiment of the present invention.

According to an embodiment of the present invention, after knowing that the UEs 350 and 360 are the supporting and non-supporting UEs respectively, the target RAN 325 determines, based on this information, the PLMN 340 to be notified to the UEs 350 and 360 in the handover procedure. That is, for the supporting UE 350, the target RAN 325 allocates, if necessary, an additional PLMN to prevent the supporting UE 350 from performing unnecessary inter-PLMN handover. For the non-supporting UE 360, the target RAN 325 allocates the common PLMN.

Similarly to the exemplary case of FIG. 2, the source RAN 320 may broadcast only the PLMN X 330 as the common PLMN while the target RAN 325 may user the PLMN Y as an additional PLMN and the PLMN X as the common PLMN. In this case, the target RAN 325 may allocate the PLMN X as an additional PLMN to the supporting UE 350. The target RAN 325 also may allocate the PLMN Y as a common PLMN to the non-supporting UE 360.

According to an embodiment, when it is not explicit to the core network 310 whether the UE 350 (or 360) is a network sharing supporting UE or a network sharing non-supporting UE, the recipient may regard the UE AS a non-supporting UE. According to an embodiment, if it is not explicit whether the UE supports network sharing in the procedure of exchanging the information on network sharing supportability of the UE among the core network 310 and the base stations 320 and 325, the recipient regards the corresponding UE is a non-supporting UE.

FIG. 4 is a flowchart illustrating the PLMN allocation procedure of the target base station according to an embodiment of the present invention.

Referring to FIGS. 3 and 4, the target RAN 325 receives a handover request from the core network at step 410. Next, the target RAN 325 determines whether the UE is a supporting UE at step 420.

If it is determined that the UE is not a supporting UE at step 420, the target RAN 325 allocates the common PLMN at step 430.

If it is determined that the UE is a supporting UE at step 420, the target eNB 325 determines whether the PLMN used under the control of the previous base station, i.e. the source base station 320, is identical with the common PLMN of the current base station, i.e. target base station 325 at step 440.

If the previous PLMN used under the control of the source base station 320 is identical with the common PLMN of the target base station 325, the target base station 325 allocates the common PLMN to the UE at step 430.

Otherwise, if the previous PLMN used under the control of the source base station 320 is different from the common PLMN of the target base station 325, the target base station 325 allocates an additional PLMN to the UE at step 450. At this time, if there is any additional PLMN of the target base station 325 which is identical with the PLMN used in the previous base station 320, the target base station 325 allocates the same PLMN to the UE. In this way, it is possible to avoid unnecessary inter-PLMN handover procedure.

A description is made of the PLMN allocation method according to the first approach with reference to detailed embodiments.

FIGS. 5 to 10 are schematic diagrams illustrating PLMN allocation procedures according to the embodiments of the present invention.

Figure 5:
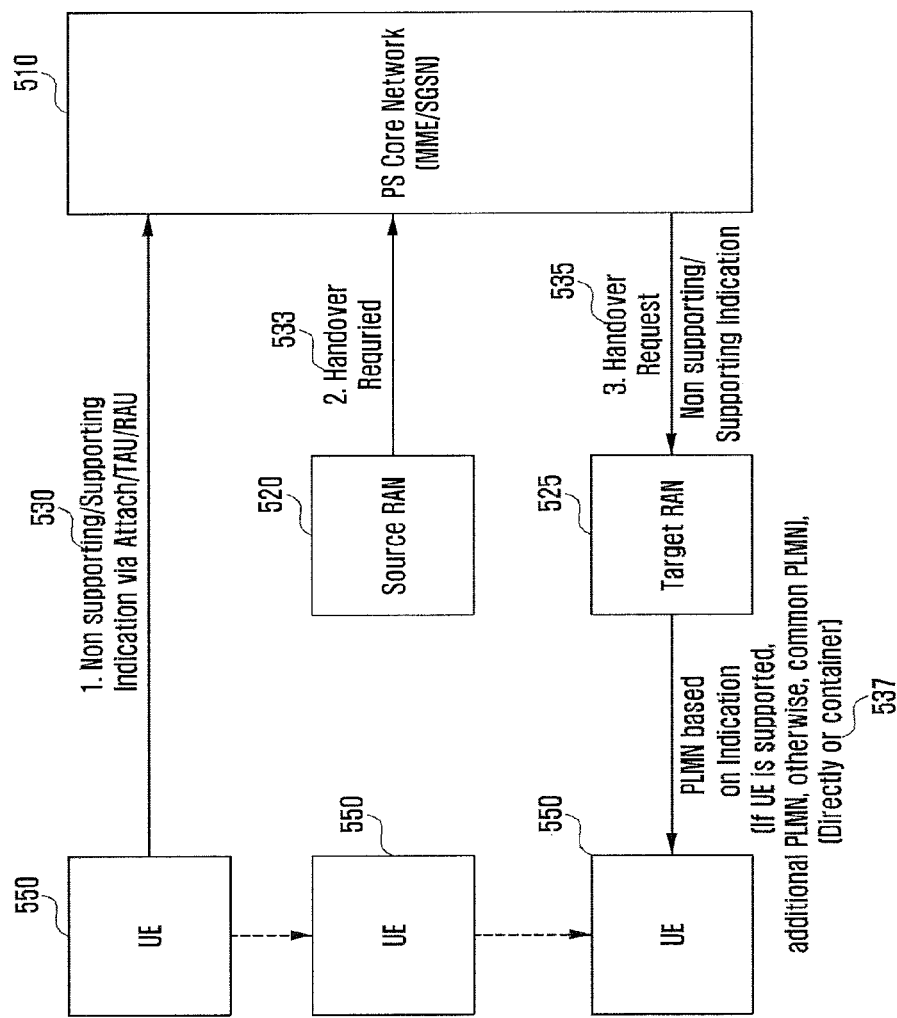
FIGS. 5 to 10 are schematic diagrams illustrating PLMN allocation procedures according to the embodiments of the present invention.

FIG. 5 shows a NAS-based solution in the Packet Switched (PS) core network (NAS-based solution-PS).

Referring to FIG. 5, the UE 550 sends the Packet-Switched (PS) Core Network (CN) 510 an attach/Tracking Area Update (TAU)/Routing Area Update (RAU) request message including the information indicating whether it is a network sharing supporting UE or a network sharing non-supporting UE at step 530. At this time, the information indicating whether the UE is a network sharing supporting UE or a network sharing non-supporting UE may be a network sharing capability indicator of the UE.

The PS CN 510 stores the network sharing capability indicator of the UE 550. Afterward, a handover required message is transmitted from the source RAN 520 to the PS CN 510 according to the necessity of handover of the UE at step 533, and the PS CN 510 sends the target RAN 525 a PS handover request message at step 535. At step 535, the PS CN 510 sends the target RAN 525 the PS handover request message including the network sharing capability indicator of the UE 550.

According to an embodiment, the PS handover request message is as follows.

PS HANDOVER REQUEST (message from Mobile Switching Center (MSC) to target Global System for Mobile communications (GSM)/Enhanced Data rates for GSM evolution and enhanced data rates for global evolution (EDGE) Radio Access Network (GERAN) through A/Gb interface: Using GERAN network sharing capability IE (1-bit field indicating supporting/non-supporting capability).

At step 537, the target RAN 525 selects a PLMN based on the network sharing capability indicator included in the PS handover request message received at step 535. That is, in the case that the UE 550 is a non-supporting UE, the common PLMN of the target RAN 525 is allocated to the UE 550. In the case that the UE 550 is a supporting UE, if the PLMN used at the source RAN 520 is identical with the common PLMN of the target RAN 525, the target RAN 525 allocates the common PLMN to the UE 550. Otherwise if the PLMN used at the source RAN 520 is not identical with the common PLMN of the target RAN 525, the target RAN 525 allocates an additional PLMN to the UE 550.

Steps 530 to 537 may be applied to a Circuit-Switched (CS) CN domain in the same manner.

Figure 6:
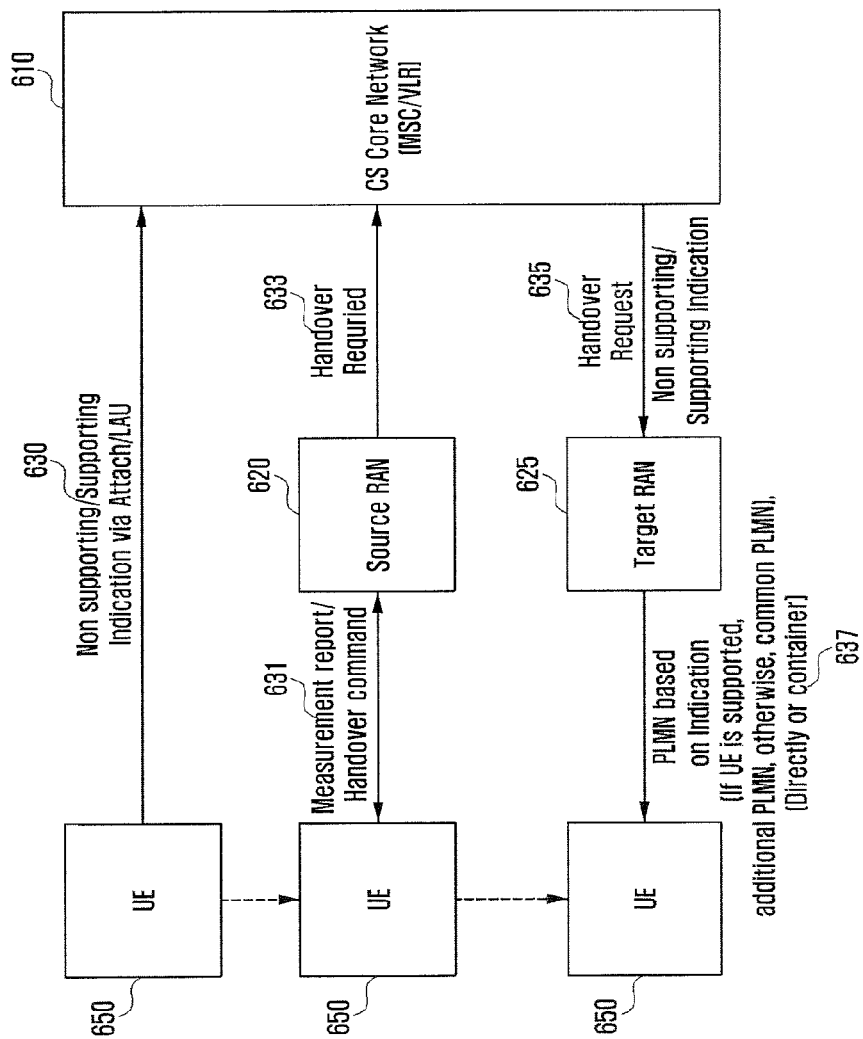

FIG. 6 shows a NAS-based solution in the Circuit-Switched Core Network (NAS-based solution-CS).

If the UE transmits the information indicating its network sharing capability to only one of PS and CS domains, this may cause a problem. For example, if the UE which is operating after transmitting its network sharing capability indicator to the PS domain releases the PS session so as to maintain only the CS session, the CS CN node has no way of supporting the network sharing.

The problem can be solved in such a way that the UE 650 sends the CS CN 610 the information indicating whether it is a network sharing supporting UE or a network sharing non-supporting UE in the attach or location update procedure as described with reference to FIG. 5.

According to an embodiment, the location update request message is as follows.

LOCATION UPDATING REQUEST (message from UE to MSC for IMSI attach or location update): Including GERAN network sharing capability IE (1-bit field indicating supporting/non-supporting capability) or GERAN network sharing capability bit in Mobile Station Classmark 1, 2, or 3.

The CS CN 610 stores the network sharing capability indicator of the UE 650. A handover command is transmitted to the RAN 620 for the handover of the UE 650 at step 631, and the source RAN 620 sends the CS CN 610 a handover required message at step 633. The CS core network 610 sends the target RAN 525 a handover request message at step 635. At step 635, the CS CN 610 may send the target RAN 625 the network sharing capability indicator of the UE 650 in the handover request message.

According to an embodiment, the handover request message is as follows.

HANDOVER REQUEST (message from MSC to target GERAN through A/Gb interface): Including GERAN network sharing capability IE (1-bit field indicating supporting/non-supporting capability) or GERAN network sharing capability bit in Mobile Station Classmark 1, 2, or 3.

At step 637, the target RAN 625 selects a PLMN based on the network sharing capability indicator of the UE which is included in the handover request message received at step 635. That is, in the case that the UE 650 is a non-supporting UE, the target RAN 625 allocates the common PLMN to the UE 650. In the case that the UE 650 is a supporting UE, if the PLMN used in the source RAN 620 is identical with the common PLMN of the target RAN 625, the target RAN 625 allocates the common PLMN to the UE 650. Otherwise if the PLMN used in the source RAN 620 is not identical with the common PLMN of the target RAN 625, the target RAN 625 allocates an additional PLMN to the UE 650.

Figure 7:
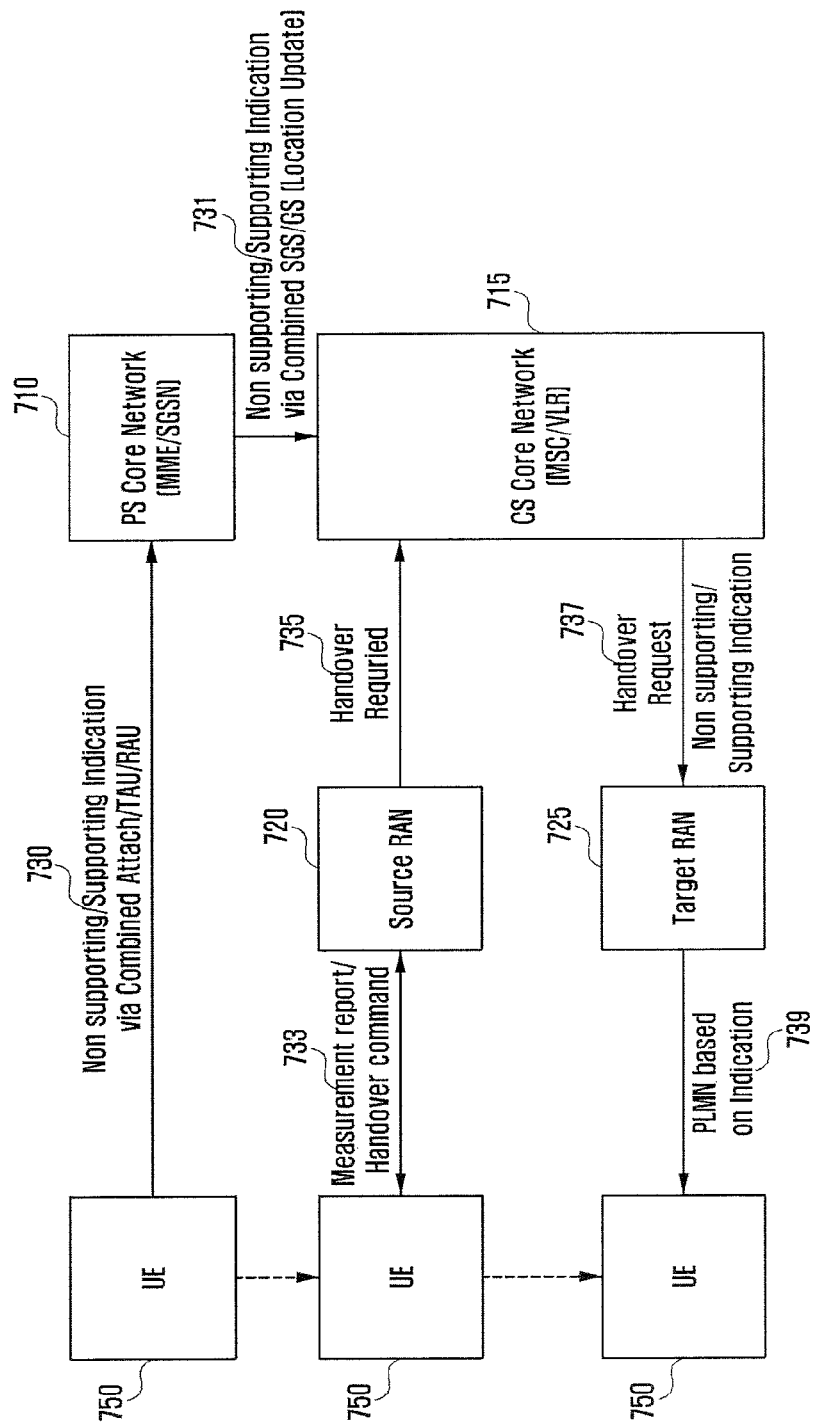

FIG. 7 shows a NAS-based solution in the combination of the PS CN and CS CN (NAS-based solution-combined.

As shown in FIG. 7, the UE 750 sends the CN 710 of the PS domain its network sharing capability information at step 730.

In this case, the PS domain CN node 710 and the CS domain CN node 715 are connected to each other. According to an embodiment, the PS domain CN node 710 may be a Mobility Management Entity (MME) or a Serving GPRS Support Node (SGSN). According to an embodiment, the CS domain CN node 715 may be a Mobile Switching Center (MSC) or a Visitor Location Register (VLR). In the case that the PS domain CN node 710 and the CS domain CN node 715 are connected to each other, it cause signaling overhead for the UE 750 to transmit its network sharing capability information to both the PS domain CN 710 and CS domain CN 715. In order to solve this problem, the PS domain CN node 710 which received the UE network sharing capability information from the UE 750 forwards this information to the CS domain CN node 715 at step 731.

In detail, if it is possible to use Circuit Switched Fall-Back (CSFB) and thus a SGs interface exists or if Network Mode of Operation (NMO) 1 is configured and thus a Gs interface is available, the UE 750 performs a combined attach/TAU/RAU procedure at step 730. At this time, the UE 750 may insert its UE network sharing capability information in the combined attach/TAU/RAU message which is transmitted to the PS CN 710. The network sharing capability information of the UE 750 may be the UE network sharing capability indicator indicating whether the UE supports network sharing.

According to an embodiment, the UE 750 may notify the PS domain CN node 710 of its network sharing capability using the following messages.

ATTACH REQUEST (message from UE to MME/SGSN): MS network capability IE includes GERAN Network sharing capability bit (1-bit supporting/non-supporting indication) or GERAN network sharing capability bit in Mobile Station Classmark 1, 2, or 3.

TRACKING AREA UPDATE REQUEST (message from UE to MME): MS network capability IE includes GERAN network sharing capability bit (1-bit supporting/non-supporting indication) or GERAN network sharing capability bit in Mobile Station Classmark 1, 2, or 3.

ROUTING AREA UPDATE REQUEST (message from UE to SGSN): MS network capability IE includes GERAN network sharing capability bit (1-bit supporting/non-supporting indication) or GERAN network sharing capability bit in Mobile Station Classmark 1, 2, or 3.

If the UE network sharing capability information is received, the PS CN 710 transmits this information to the CS CN 715 in the location update procedure at step 731.

In detail, the Attach/TAU/RAU received by the PS domain CN node 710 may request for association with the CS domain CN node 715. In this case, the UE 750 may send the CS domain CN node 715 the location update request message including the UE network sharing capability information instead of notifying the CS domain CN node directly whether it supports network sharing.

According to an embodiment, the location update request message is as follows.

SGsAP-LOCATION-UPDATE-REQUEST (message from MME to MSC/VLR): Including GERAN network sharing capability IE (1-bit supporting/non-supporting indication field) or GERAN network sharing capability bit in Mobile Station Classmark 1, 2, or 3.

LOCATION-UPDATE-REQUEST (message from SGSN MSC/VLR): Including GERAN network sharing capability IE (1-bit supporting/non-supporting indication field) or GERAN network sharing capability bit in Mobile Station Classmark 1, 2, or 3.

The subsequent procedure of notifying, when handover is triggered, the target RAN 725 of the UE network sharing capability information such that the target RAN 725 selects a PLMN based on the information and notifies the UE 750 of the selected PLMN is similar to the above described embodiments.

That is, if the UE network sharing capability information is received in the handover situation, the CS CN node 715 sends the target RAN 725 the handover request message including the UE network sharing capability information.

In detail, in the state that the CS CN 715 retains the network sharing capability information of the UE 750, the source RAN 720 transmits a handover command for handover of the UE 750 at step 733 and transmits a handover required message to the CS CN 715 at step 735. The CS CN 715 transmits a handover request message to the target RAN 725 at step 737. At this time, the CS CN 715 inserts the retained network sharing capability indicator of the UE 750 into the handover request message which is transmitted to the target RAN 725.

At step 739, the target RAN 725 selects a PLMN using the UE network sharing capability indicator included in the handover request message received at step 737. That is, in the case that the UE 750 is a non-supporting UE, the common PLMN of the target RAN 725 is allocated to the UE 750. In the case that the UE 750 is a supporting UE, if the PLMN used at the source RAN 720 is identical with the common PLMN of the target RAN 725, the target RAN 725 allocates the common PLMN to the UE 750. Otherwise if the PLMN used at the source RAN 720 is not identical with the common PLMN of the target RAN 725, the target RAN 725 allocates an additional PLMN to the UE 750.

Figure 8:
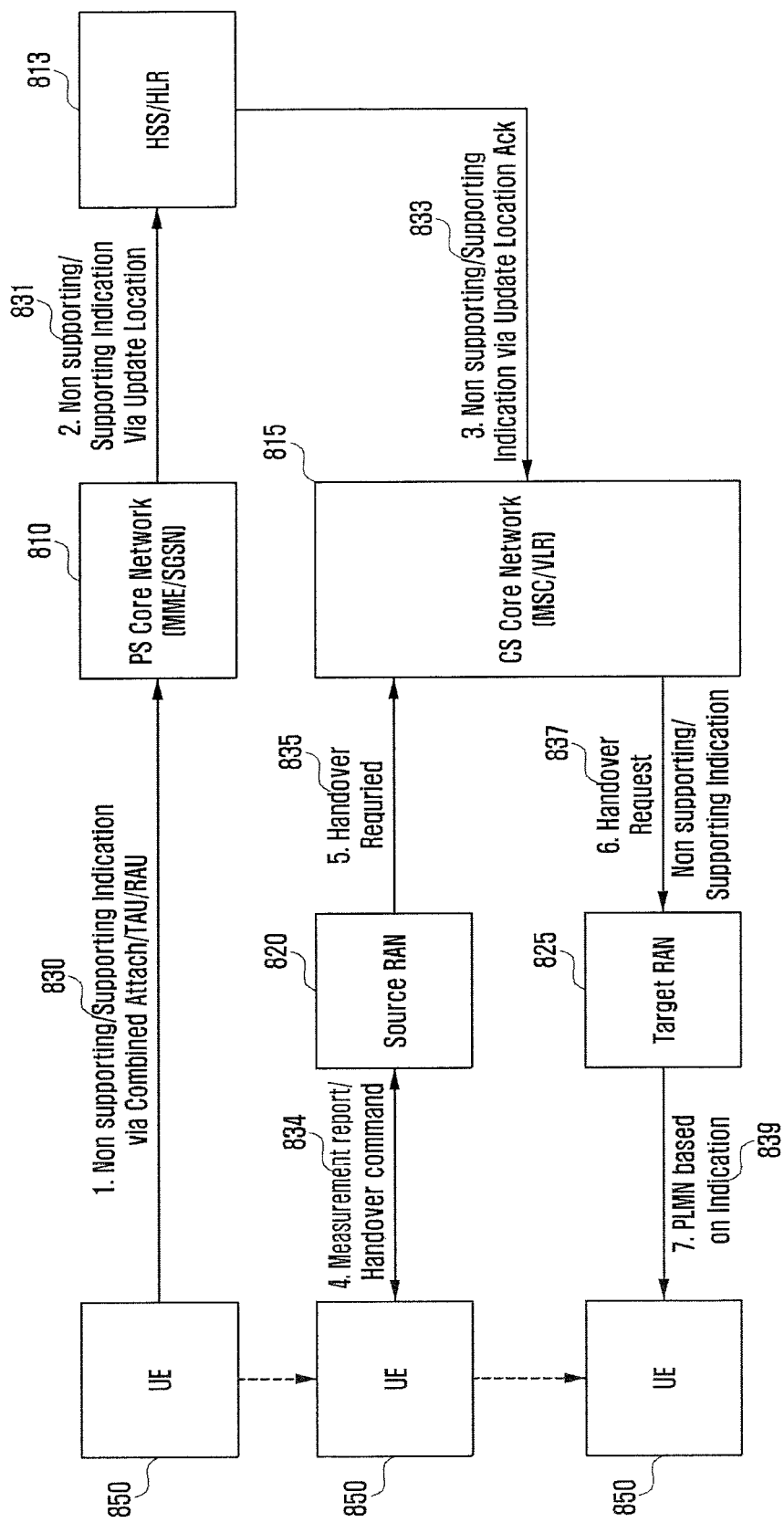

FIG. 8 shows a NAS-based solution via Home Subscriber Server (HSS) (NAS-based solution-via HSS).

In the embodiment of FIG. 7, it is possible to prevent the UE from transmitting its network sharing capability information to both the PS and CS domains. However, such an embodiment can be applied only when the SGs/Gs connection is established. In the case of passing through the HSS/HLR as shown in FIG. 8, however, it is possible to prevent the UE from transmitting its network sharing capability information to both the PS and CS domains with establishment of SGs/Gs connection.

Referring to FIG. 8, in the case that the UE 850 is attached to the PS domain first, the UE 850 sends the CN 810 of the PS domain its UE network sharing capability information at step 830. That is, the UE 850 may perform the combined attach/TAU/RAU procedure at step 830. At this time, the UE 850 inserts its network sharing capability information into the combined attach/TAU/RAU message which is transmitted to the PS CN 810. The network sharing capability information of the UE 850 may be the UE network sharing capability indicator informing whether the UE supports network sharing.

The PS CN 810 may store the UE network sharing capability information. The PS CN 810 may insert the UE network sharing capability information in the update location request message which is transmitted to the HSS 813 at step 831.

According to an embodiment of the present invention, the update location request message is as follows.

UPDATE LOCATION REQUEST (message from MME/SGSN to HSS): Including GERAN network sharing capability IE (1-bit field indicating supporting/non-supporting capability) or GERAN network sharing capability bit in Mobile Station Classmark 1, 2, or 3.

If the update request message including the UE network sharing capability information is received at step 831, the HSS 813 stores the UE network sharing capability information. Afterward, if the UE 850 attempts IMSI attach to the CS domain, the HSS 813 sends the CS domain CN node 815 the Location Update Accept message including the UE network sharing capability information to the CS domain CN node 815 at step 833.

According to an embodiment, the Location Update Accept message is as follows.

LOCATION UPDATE ACCEPT (message from HSS/HLR to MSC/VLR): Including GERAN network sharing capability IE (1-bit field indicating supporting/non-supporting capability) or GERAN network sharing capability bit in Mobile Station Classmark 1, 2, or 3.

The subsequent procedure of notifying, when handover is triggered, the target RAN 825 of the UE network sharing capability information such that the target RAN 825 selects a PLMN based on the information and notifies the UE 850 of the selected PLMN is similar to the above described embodiments.

That is, in the case of performing handover of the UE 850 after receiving the UE network sharing capability information from the HSS 813, the CS domain CN node 815 may insert the UE network sharing capability information in the handover request message which is transmitted to the target RAN 825.

In detail, in the state that the CS CN 815 retains the network sharing capability information of the UE 850, the source RAN 820 transmits a handover command for handover of the UE 850 at step 834 and transmits a handover required message to the CS CN 815 at step 835. The CS CN 815 transmits a handover request message to the target RAN 825 at step 837. At this time, the CS CN 815 inserts the retained network sharing capability indicator of the UE 850 into the handover request message which is transmitted to the target RAN 725.

At step 839, the target RAN 825 selects a PLMN using the UE network sharing capability indicator included in the handover request message received at step 837. That is, in the case that the UE 850 is a non-supporting UE, the common PLMN of the target RAN 825 is allocated to the UE 850. In the case that the UE 850 is a supporting UE, if the PLMN used at the source RAN 820 is identical with the common PLMN of the target RAN 825, the target RAN 825 allocates the common PLMN to the UE 850. Otherwise if the PLMN used at the source RAN 820 is not identical with the common PLMN of the target RAN 825, the target RAN 825 allocates an additional PLMN to the UE 850.

In the case that the UE 850 is attached to the CS domain first, the CS domain CN node 815 may send the HSS/HLR 813 the UE network sharing capability information. The HSS/HLR 813 may forward the UE network sharing capability information to the PS domain CN node 810.

Figure 9:
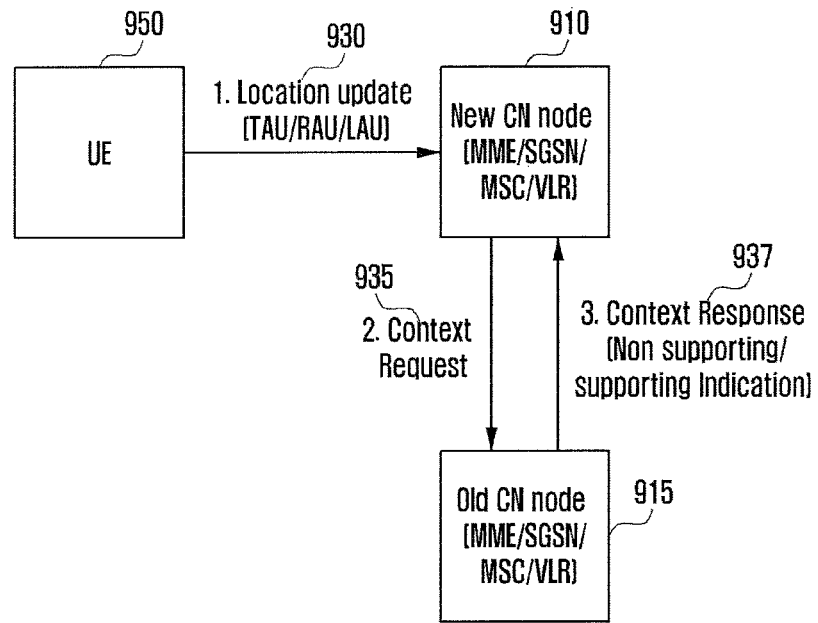

FIG. 9 is shows a procedure of transferring UE network sharing capability information to a new core network for Inter-Core Network update.

Referring to FIG. 9, the Inter-core network node mobility/Tracking Area Update (TAU)/Routing Area Update (RAU)/Location Area Update (LAU) occurs due to the mobility of the UE 8=950. In this case, the old network node to which the UE 950 has connected may retain the network sharing capability information of the UE 950 as described in the above embodiments.

The new core network 910 to which the UE connects to newly sends a Context Request to the old core network 915 at step 935.

In response to the request, the old core network node 915 sends the new core network 910 the information on the network sharing, i.e. RAN sharing, capability reported by the UE 950 at step 937. At this time, the old core network 915 may send the new core network 910 the UE a Context Response including network sharing capability information.

According to an embodiment, the context response message is as follows.

CONTEXT REPONSE (message from Old CN node to New CN node: Including GERAN network sharing capability IE (1-bit field indicating supporting/non-supporting capability) or GERAN network sharing capability bit in Mobile Station Classmark 1, 2, or 3.

The new CN node 910 may retain the received UE network sharing capability information and sends, when a handover is triggered afterward, the UE network sharing capability information to the target RAN node (not shown).

Figure 10:
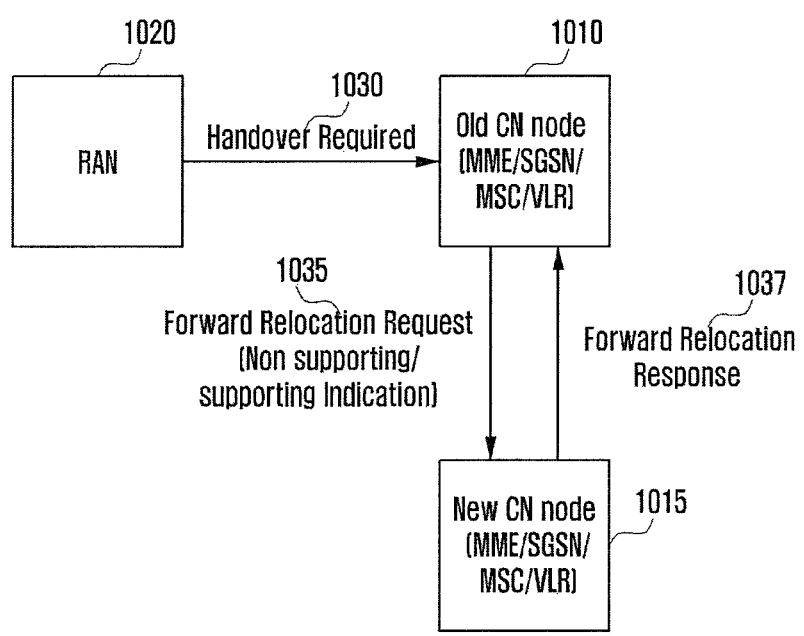

FIG. 10 shows a procedure of transferring the UE network sharing capability information to a new core network according to the Forward Relocation in handover.

Referring to FIG. 10, in the case that it is required to change the serving core network node of the UE in the middle of handover at step 1030, the old core network node 1010 to which the UE (now shown) has connected may include the UE network sharing capability information as described in the above embodiments.

The old core network node 1010 may send the new core network node 1015 the UE network sharing capability information using the UE context. The old core network node 1010 also may send the network core network the UE network sharing capability information using the Forward Relocation Request message.

According to an embodiment, the Forward Relocation Request message is as follows.

FORWARD RELOCATION REQUEST (message from Old CN node to New CN node): Including GERAN network sharing capability IE (1-bit field indicating supporting/non-supporting capability) or GERAN network sharing capability bit in Mobile Station Classmark 1, 2, or 3.

The new core network node 1015 may retain the receive UE network sharing capability information and send, when handover is triggered afterward, the UE network sharing capability information to the target RAN node.

Hereinabove, a description has been made of the method for the target RAN to select the PLMN for use by a UE according to the first embodiment hereinabove.

A description is made of the method for the source RAN to select the PLMN for use by a UE according to the second approach hereinafter.

Figure 11:
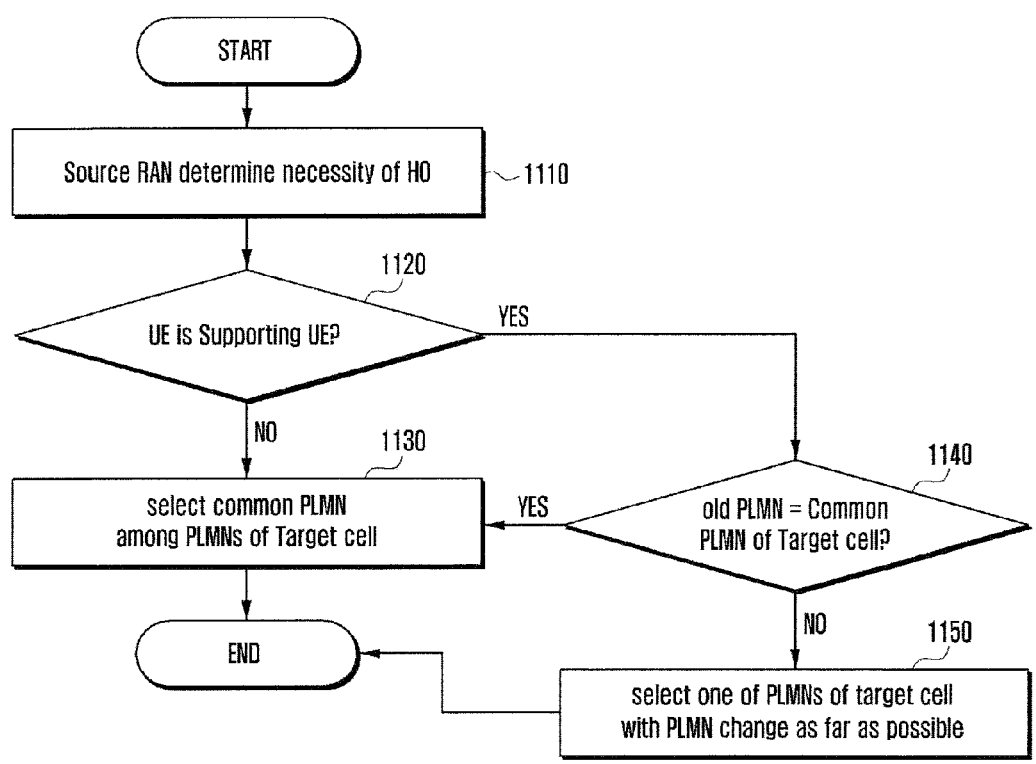
FIG. 11 is a flowchart illustrating a PLMN allocation procedure according to an embodiment of the present invention.

FIG. 11 is a flowchart illustrating a PLMN allocation procedure according to an embodiment of the present invention.

Unlike the first approach described with reference to FIGS. 3 to 10, the second approach is capable of allowing the source RAN to select the PLMN for use by the UE after handover depending on whether the UE is a network sharing supporting UE or a network sharing non-supporting UE.

Referring to FIG. 11, the source RAN determines whether a handover is required at step 1110. Afterward, the source RAN determines whether the UE is a supporting UE at step 1120.

If it is determined that the UE is a non-supporting UE at step 1120, the source RAN allocates a common PLMN to the UE among the PLMN supported by the handover target RAN at step 1130.

If it is determined that the UE is a supporting UE at step 1120, the source RAN notifies a source core network node of the PLMN which has been allocated to the UE before handover such that the PLMN is not changed as far as possible.

In detail, if the UE is a supporting UE at step 1120, the source RAN determines whether the old PLMN used in association with the RAN before handover, i.e. the source RAN, is identical with the common PLMN of the new RAN, i.e. the target RAN, at step 1140.

If the old PLMN used in association with the source RAN is identical with the common PLMN of the target RAN, the source RAN allocates the common PLMN to the UE among the PLMNs of the target RAN at step 1130.

Otherwise if the old PLMN used in association with the source RAN is different from the common PLMN of the target RAN, the source RAN allocates an additional PLMN to the UE among the PLMNs of the target RAN at step 1150. At this time, if any additional PLMN of the target RAN is identical with the PLMN used in the old RAN, the target RAN selection the identical PLMN for allocation to the UE.

In order to apply the second approach, the source RAN has to know the PLMNs supported by the neighboring RANs and which is the common PLMN among the PLMNs. In order to accomplish this, the base stations may exchange the information on the PLMNs supported and common PLMN whenever a new base station is deployed or periodically. If there is no direct connection among the RAN nodes, this information may be exchanged through a third node (e.g. SGSN). At this time, a message structured as follows may be used.

SNA (Shared Network Area) IE
Authorised PLMNs (1 to multiple)
→PLMN Identity, Common PLMN flag
Or
SNA (Shared Network Area) IE
Authorised PLMNs (1 to multiple)
→PLMN Identity
Common PLMN (1)
→PLMN Identity A description is made of the PLMN allocation method according to the second approach with reference to detailed embodiments.

Figure 12:
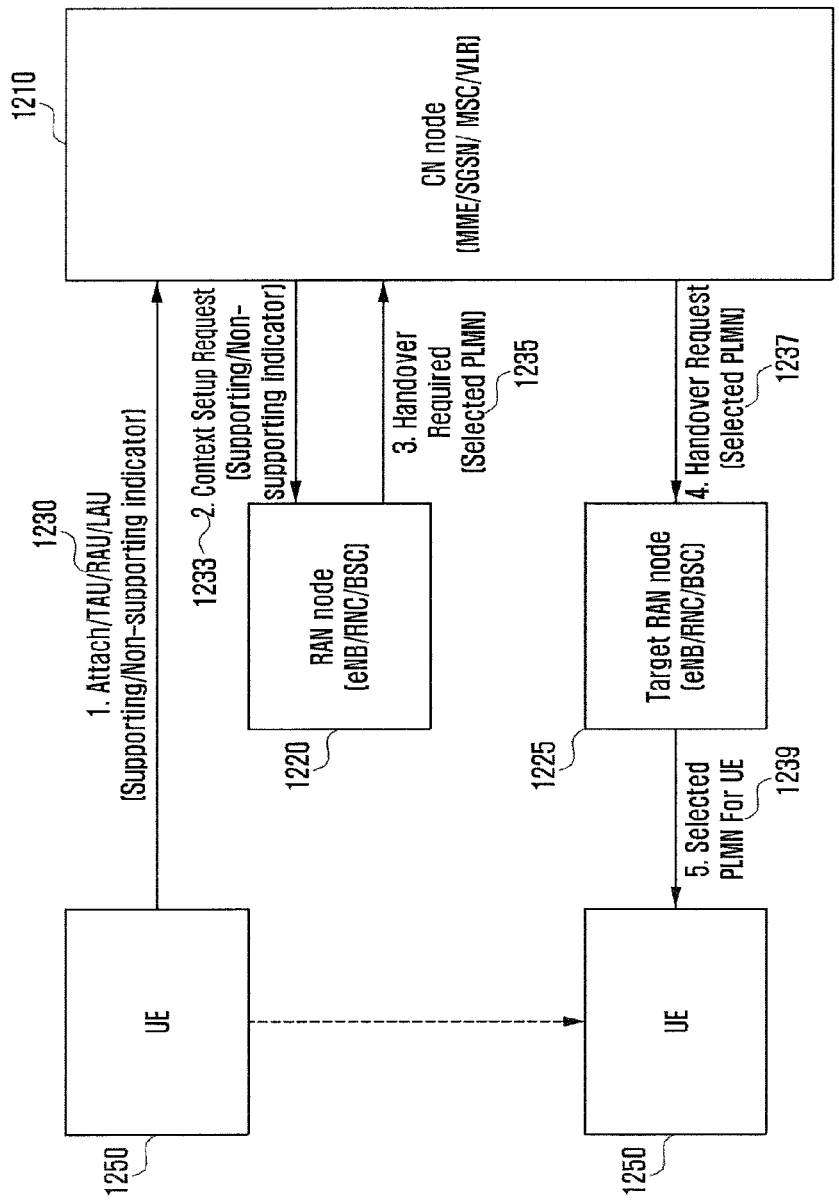
FIGS. 12 and 13 are schematic diagrams illustrating PLMN allocation procedures according to the embodiments of the present invention.
Figure 13:
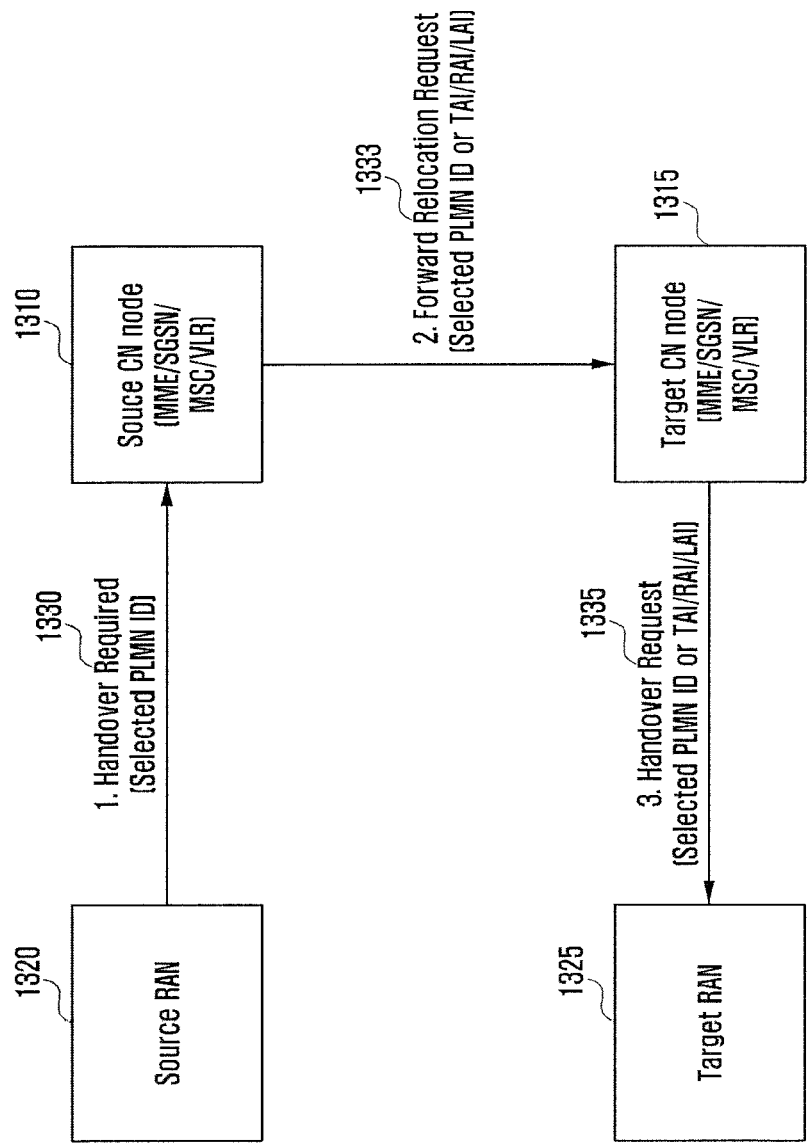

FIGS. 12 and 13 are schematic diagrams illustrating PLMN allocation procedures according to the embodiments of the present invention.

FIG. 12 shows a NAS-based solution.

The Packet Switched (PS)/Circuit Switched (CS) domain core network node operation for determining whether the UE is a supporting UE or a non-supporting node in the embodiments described with FIGS. 3 to 10 in association with the first approach can be applied to the second approach without modification.

Unlike the first approach, the second approach is characterized in that the source RAN determines the PLMN to be used in the target RAN. In order to accomplish this, the core network node stores the UE network sharing capability information as in the embodiments described with reference to FIGS. 3 to 10. The core network node notifies the source RAN of the stored UE network sharing capability information such that the source RAN selects a PLMN based thereon.

Referring to FIG. 12, the UE 1250 notifies the core network node 1210 that it is a non-supporting UE at step 1230. The node 1250 may send the core network node 1210 the network sharing capability information in a similar manner to the embodiments of FIGS. 3 to 10. Detailed description thereof is omitted herein for convenience purpose.

Whenever the RAN node changes and thus the UE 1250 enters the active state due to the mobility of the UE 1250, the core network node 1210 sends the RAN node the UE network sharing capability information along with the UE context at step 1233.

According to an embodiment, the following messages can be used.

INITIAL CONTEXT SETUP REQUEST (message from MME to eNB): Including GERAN network sharing capability IE (1-bit field indicating supporting/non-supporting capability) or GERAN network sharing capability bit in Mobile Station Classmark 1, 2, or 3.

COMMON ID (message from SGSN/MCS to Radio Network Controller (RNC): Including GERAN network sharing capability IE (1-bit field indicating supporting/non-supporting capability) or GERAN network sharing capability bit in Mobile Station Classmark 1, 2, or 3.

DL-UNIDATA (message from SGSN to Base Station Controller (BSC): Including GERAN network sharing capability IE (1-bit field indicating supporting/non-supporting capability) or GERAN network sharing capability bit in Mobile Station Classmark 1, 2, or 3.

CREATE-BSS-PFC (message from SGSN to BSC): Including GERAN network sharing capability IE (1-bit field indicating supporting/non-supporting capability) or GERAN network sharing capability bit in Mobile Station Classmark 1, 2, or 3.

ASSIGNMENT REQUEST (message from MSC to BSC): Including GERAN network sharing capability IE (1-bit field indicating supporting/non-supporting capability) or GERAN network sharing capability bit in Mobile Station Classmark 1, 2, or 3.

COMMON ID (message from MSC to BSC): Including GERAN network sharing capability IE (1-bit field indicating supporting/non-supporting capability) or GERAN network sharing capability bit in Mobile Station Classmark 1, 2, or 3.

As described above, the RAN node having information on whether the UE is a supporting UE or a non-supporting UE uses this information to select the PLMN to be use in the target cell 1225. That is, if the UE 1250 is a non-supporting UE, the source RAN node 1220 selects the common PLMN. Otherwise if the UE is a supporting UE, the source RAN node 1220 selects the same PLMN for the UE 1250 without PLMN change as far as possible. The source RAN node 1220 selects the core network node 1210 belonging to the PLMN of the core network node 1210 to which the UE 1220 connects according to the selected PLMN, and sends the core network node 1210 a message notifying of the selected PLMN at step 1235. At this time, a Tracking Area Identifier (TAI), Routing Area Identifier (RAI), or a Location Area Identifier (LAI) may be used instead of the selected PLMN ID.

According to an embodiment, the selected PLMN information may be carried in the following messages.

HANDOVER REQUIRED (message from eNB to MME): Including selected PLMN Identifier or TAI/RAI/LAI.

PS HANDOVER REQUIRED (message from BSC to SGSN): Including selected PLMN Identifier or TAI/RAI/LAI.

HANDOVER REQUIRED (message from BSC to MSC): Including selected PLMN Identifier or TAI/RAI/LAI.

RELOCATION REQUIRED (message from RNC to SGSN/MSC): Including selected PLMN Identifier or TAI/RAI/LAI.

FIG. 13 shows a procedure of transmitting the UE network sharing capability information to a new core network according to the Forward Relocation in handover.

Revering to FIG. 13, if the core network node is changed in the middle of handover, the source core network node 1310 receives the selected PLMN information (including TAI/RAI or LAI) from the source RAN 1320 at step 1330. The source core network node 1310 forwards the received PLMN information (including TAI/RAI or LAI) to the target core network node 1315.

According to an embodiment, the selected PLMN information (including TAI/RAI or LAI) may be carried in the following messages.

FORWARD RELOCATION REQUEST (message from source CN node to target CN node): Including the selected PLMN identifier or TAI/RAI/LAI).

Afterward, the target core network node 1315 may notify the target RAN 1325 of the selected PLMN using the Handover Request message.

According to an embodiment, the handover request message is as follows.

HANDOVER REQUEST (message from MME to eNB): Including Selected PLMN identifier or TAI/RAI/LAI.

PS HANDOVER REQUEST (message from SGSN to BSC): Including Selected PLMN identifier or TAI/RAI/LAI.

HANDOVER REQUEST (message from MSC to BSC): Including Selected PLMN identifier or TAI/RAI/LAI.

RELOCATION REQUEST (message from MSC/SGSN to RNC): Including selected PLMN identifier or TAI/RAI/LAI Although not depicted, according to another embodiment of the present invention, the UE may notify the core network node whether it is a GERAN sharing supporting UE or GERAN sharing non-supporting UE in order for the core network node to select a PLMN based thereon. In the present embodiment, the UE may send its network sharing capability information to the RAN node directly. The UE notifies the base station whether it is a supporting UE or a non-supporting UE when establishing a connection with the RAN node. The base station retains this information and, when handover is triggered, selects a PLMN for use in the target RAN based on this information.

According to an embodiment, the message transmitted from the UE to the base station may be as follows.

RRC CONNECTION REQUEST (message from UE to RAN): Including GERAN network sharing capability IE (1-bit field indicating supporting/non-supporting capability) or GERAN network sharing capability bit in Mobile Station Classmark 1, 2, or 3.

RRC CONNECTION REQUEST (message from UE to RAN): Including GERAN network sharing capability IE (1-bit field indicating supporting/non-supporting capability) or GERAN network sharing capability bit in Mobile Station Classmark 1, 2, or 3.

RRC CONNECTION SETUP COMPLETE (message from UE to RAN): Including GERAN network sharing capability IE (1-bit field indicating supporting/non-supporting capability) or GERAN network sharing capability bit in Mobile Station Classmark 1, 2, or 3.

INFORMATION TRANSFER (message from UE to RAN): Including GERAN network sharing capability IE (1-bit field indicating supporting/non-supporting capability) or GERAN network sharing capability bit in Mobile Station Classmark 1, 2, or 3.

CAPABILITY INFORMATION (message from UE to RAN): Including GERAN network sharing capability IE (1-bit field indicating supporting/non-supporting capability) or GERAN network sharing capability bit in Mobile Station Classmark 1, 2, or 3.

If necessary, the UE network sharing capability information received by the RAN node according to the above embodiments may be transferred to another network entity. For example, the RAN node may transmit the received information to a core network node such as SGSN/MME/MSC or another RAN node. If handover is triggered, the RAN node may send the target RAN node the UE network sharing capability information using a transparent container.

Hereinabove, a description has been made of the method for the source RAN to select the PLMN for use by a UE according to the second approach.

A description is made of the method for the core network to select a PLMN for use by a UE according to the third approach.

According to the embodiments of the first and second approaches that are described with FIGS. 3 to 13, the core network node may know whether the UE is a supporting UE or a non-supporting UE. Detailed description thereof is omitted herein.

The source RAN may select a PLMN and notify the core network node of the selected PLMN or sends the core network node a handover request without selecting any PLMN. In this case, if the UE is a non-supporting UE, the core network node selects the common PLMN as the PLMN for use in the target RAN and, otherwise, selects a PLMN, which is not changed as far as possible, and notifies the target RAN node of the selected PLMN. If it is required to change the PLMN depending on whether the UE supports the network sharing function even though the source RAN selected a PLMN and notified of the selected PLMN, the core network node may change the PLMN for the UE. The core network node may notify the target RAN node of the selected PLMN using the handover request message. Since how to notify the target RAN node of the selected PLMN has been described, detailed description thereof is omitted herein.

Figure 14:
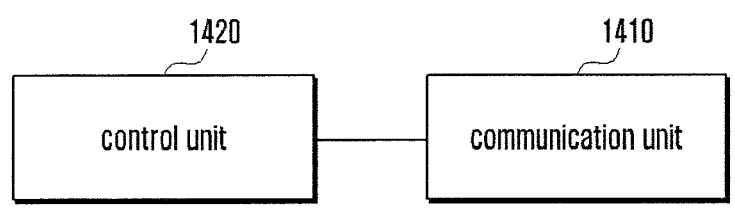
FIG. 14 is a block diagram illustrating a configuration of the UE according to an embodiment of the present invention.

FIG. 14 is a block diagram illustrating a configuration of the UE according to an embodiment of the present invention.

Referring to FIG. 14, the control unit 1410 controls the UE to perform at least one of the operations of the above described embodiments. For example, the control unit 1410 may control the UE to transmit the UE network sharing capability information to the base station or the core network. The base station or the core network may select a PLMN identifier based on the UE network sharing capability information.

The communication unit 1420 communicates signal according to one of the operations of the above described embodiments. For example, the communication unit 1420 may transmit the UE network sharing capability information to the base station or the core network. The communication unit 1420 also may receive the selected PLMN identifier from the base station.

Figure 15:
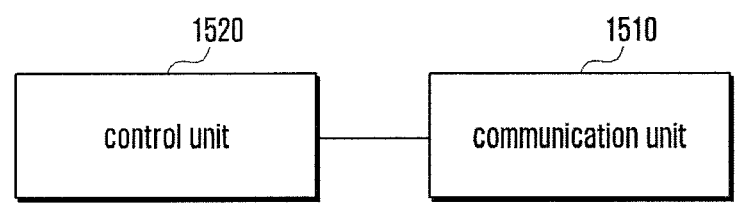
FIG. 15 is a block diagram illustrating a configuration of the base station according to an embodiment of the present invention.

FIG. 15 is a block diagram illustrating a configuration of the base station according to an embodiment of the present invention.

Referring to FIG. 15, the control unit 1510 controls the base station to perform on of the operations of the above-described embodiments. For example, the control unit 1510 may control the base station to receive the handover request message including the UE network sharing capability information from the core network, selects the common PLMN ID based on the UE network sharing capability information, and sends the selected PLMN ID to the UE. The control unit 1510 also may determine whether it is necessary to hand over the UE and control the base station to receive the UE network sharing capability information, select PLMN ID based on the UE network sharing capability information, and transmit the selected PLMN ID to the core network.

The communication unit 1520 transmits/receives signals according to one of the operations of the above-described embodiments. For example, the communication unit 1520 may receive the UE network sharing capability information from the core network. The communication unit 1520 also may transmit the selected PLMN ID to the core network or the UE.

Figure 16:
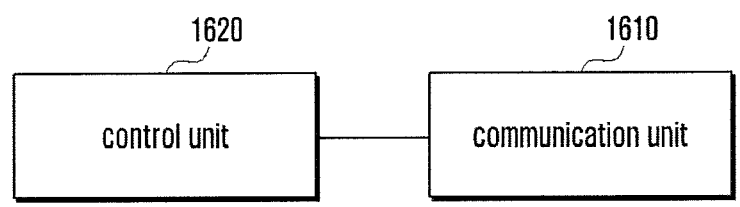
FIG. 16 is a block diagram illustrating a configuration of the core network according to an embodiment of the present invention.

FIG. 16 is a block diagram illustrating a configuration of the core network according to an embodiment of the present invention.

Referring to FIG. 16, the control unit 1610 controls the core network to perform on of the operations of the above-described embodiments of the present invention. For example, the control unit 1610 controls the core network to receive the UE network sharing capability information, select a PLMN ID based on the UE network sharing capability information, and transmit the selected PLMN ID to the base station.

The communication unit 1620 may transmit/receive signals according to one of the operations of the above-described embodiments. For example, the communication unit 1620 may receive the UE network sharing capability information. The communication unit 1620 also may transmit the selected PLMN ID to the base station.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Therefore, a detailed description of the above should not be construed as limited in all respects but as considered exemplarily. The scope of the present invention is to be determined by a reasonable interpretation of the appended claims and include all the changes within the equivalent range of the present invention.

The invention claimed is:

1. A communication method of a first network entity, the method comprising:
   receiving, from a second network entity, a handover request message including information on network sharing capability of a terminal;
   selecting a public land mobile network (PLMN) identifier (ID) based on the information on network sharing capability of the terminal; and
   transmitting a message including the selected PLMN ID to the second network entity.

2. The method of claim 1, wherein selecting the PLMN ID comprises:
   selecting a common PLMN ID, if the terminal does not support the network sharing.

3. The method of claim 1, wherein selecting the PLMN ID comprises:
   selecting a same PLMN ID as one received from the second network entity, if the terminal supports the network sharing.

4. The method of claim 1, wherein the information on network sharing capability of the terminal is transmitted using a transparent container.

5. The method of claim 1, wherein the information on network sharing capability of the terminal indicates supporting or not supporting using one bit.

6. A communication method of a second network entity, the method comprising:
   receiving, from a core network node, a first message including information on network sharing capability of a terminal;
   determining whether handover of a terminal is required;
   transmitting, to a first network entity, a handover request message including information on the network sharing capability of the terminal, if the handover is required; and
   receiving, from the first network entity, a second message including a public land mobile network (PLMN) identifier (ID) for handover,
   wherein the PLMN ID is selected based on the information on network sharing capability of the terminal included in the second message by the first network entity.

7. The method of claim 6, wherein the selected PLMN ID is a common PLMN ID, if the terminal does not support a network sharing.

8. The method of claim 6, wherein the selected PLMN ID is a same PLMN ID as one received from the second network entity, if the terminal supports the network sharing.

9. The method of claim 6, wherein the information on network sharing capability of the terminal is transmitted using a transparent container.

10. The method of claim 6, wherein the information on network sharing capability of the terminal indicates supporting or not supporting using one bit.

11. A communication method of a network node, the method comprising:
    receiving, from a terminal, an attach request message including information on network sharing capability of the terminal; and
    transmitting, to a second network entity, a message including the information on network sharing capability of the terminal,
    wherein the information on network sharing capability of the terminal included in the message is used for being selected a public land mobile network (PLMN) identifier (ID) for the terminal by a first network entity.

12. The method of claim 11, wherein the selected PLMN ID is a common PLMN ID, if the terminal do not support a network sharing.

13. The method of claim 11, wherein the selected PLMN ID is a same PLMN ID as one received from the second network entity, if the terminal supports the network sharing.

14. The method of claim 11, wherein the information on network sharing capability of the terminal indicates supporting or not supporting using one bit.

15. A first network entity comprising:
    a communication unit configured to:
      transmit and receive a signal; and
    a control unit configured to:
      control the communication unit to receive a handover request message including information on network sharing capability of a terminal from a second network entity,
      select a public land mobile network (PLMN) identifier (ID) based on the information on network sharing capability of the terminal, and
      control the communication unit to transmit a message including the selected PLMN ID to the second network entity.

16. The first network entity of claim 15, wherein the control unit is further configured to select a common PLMN ID if the terminal does not support network sharing.

17. The first network entity of claim 15, wherein the control unit is further configured to select a same PLMN ID as one received from the second network entity, if the terminal supports network sharing.

18. The first network entity of claim 15, wherein the information on network sharing capability of the terminal is transmitted using a transparent container.

19. The first network entity of claim 15, wherein the information on network sharing capability of the terminal indicates supporting or not supporting using one bit.

20. A second network entity comprising:
a communication unit configured to transmit and receive a signal; and
a control unit configured to:
control the communication unit to receive a first message including information on network sharing capability of a terminal from a core network node,
determine whether handover of a terminal is required,
control the communication unit to transmit a handover request message including information on the network sharing capability of the terminal to a first network entity, if the handover is required, and
receive a second message including a public land mobile network (PLMN) identifier (ID) for handover from the first network entity,
wherein the PLMN ID is selected based on the information on network sharing capability of the terminal included in the handover request message by the first network entity.

21. The second network entity of claim 20, wherein the selected PLMN ID is a common PLMN ID, if the terminal does not support network sharing.

22. The second network entity of claim 20, wherein the selected PLMN ID is a same PLMN ID as one received from the second network entity, if the terminal supports the network sharing.

23. The second network entity of claim 20, wherein the information on network sharing capability of the terminal is transmitted using a transparent container.

24. The second network entity of claim 20, wherein the information on network sharing capability of the terminal indicates supporting or not supporting using one bit.

25. A network node comprising:
a communication unit which transmits and receives a signal; and
a control unit configured to:
control the communication unit to receive an attach request message including information on network sharing capability of a terminal from the terminal, and
control the communication unit to transmit a message including the information on network sharing capability of the terminal to a second network entity,
wherein the information on network sharing capability of the terminal included in the message is used for being selected a public land mobile network (PLMN) identifier (ID) for the terminal by a first network entity.

26. The network node of claim 25, wherein the selected PLMN ID is a common PLMN ID, if the terminal do not support a network sharing.

27. The network node of claim 25, wherein the selected PLMN ID is a same PLMN ID as one received from the second network entity, if the terminal supports the network sharing.

28. The network node of claim 25, wherein the information on network sharing capability of the terminal indicates supporting or not supporting using one bit.

* * * * *